Patented Oct. 28, 1952

2,615,450

UNITED STATES PATENT OFFICE 2,615,450

SUTURE TREATMENT AND PRODUCT

John O. Bower, Wyncote, Pa.

No Drawing. Application June 9, 1948,
Serial No. 32,030

11 Claims. (Cl. 128—335.5)

This invention has to do with hemoglobin-containing surgical sutures. It embraces methods by which the hemoglobin content of such sutures may be "fixed," or rather, converted into a form which is taken up relatively slowly by the human system, and it also embraces the products resulting from the performance of those methods, which are new and valuable instrumentalities for the surgical profession.

The production of hemoglobin-containing sutures has been disclosed by me in various prior applications for Letters Patent, to which reference will be made hereinafter. Such sutures are characterized in that their presence in living tissue is not accompanied by manifestations of local irritation, and further, in that the body does not react to isolate and destroy them, as it attacks conventional sutures, but rather accepts them and utilizes them in the formation of new tissue. Under certain circumstances, however, it is desirable to delay this reparative process, lest the physical strength of the suture be impaired before healing of the injury has advanced to such a degree that the new tissues are able to bear the stresses imposed upon them by the weight and movement of adjacent flesh.

I have discovered that it is possible to treat hemoglobin-containing surgical sutures in such a way as to ensure that the healing and bacteriostatic properties of the hemoglobin will not be entirely dissipated until healing has progressed to such a degree as to remove the necessity for these characteristics. I have further discovered that this treatment also tends to slow down the rate at which the structure of absorbable sutures is incorporated into new tissue.

Furthermore, sutures which have been subjected to the treatment possess many desirable and novel characteristics, from the physical, in addition to the physiological, point of view. For instance, sutures of the present invention have a very smooth surface, almost as smooth as glass, and this means that they can be implanted very easily, with a minimum of friction attendant upon the passing of the suture through the tissues. Since the pull required to draw them through is slight, there is less risk of tearing the flesh. Also, the strands are highly flexible, making for ease of handling and tying; yet, upon being tied, the knots neither slip or loosen. Still further, these sutures have a marked resistance to contamination and will maintain sterility under circumstances which would render most sutures unsafe.

The object of my invention is to impart to organic surgical sutures containing hemoglobin the properties set forth above, and such other desirable properties as may be incident to the treatment herein after described.

The treatment depends for its effectiveness on the presence of a substantial amount of hemoglobin in the suture. I have disclosed, in application Ser. No. 502,503, filed September 15, 1943, now Patent No. 2,493,943, dated January 10, 1950, the incorporation of hemoglobin in a surgical suture by simply steeping a conventional animal or vegetable-fiber suture in a solution prepared from the red-blood residue, which remains after the centrifugal extraction of serum or plasma from whole blood. The same application discloses the spinning of surgical sutures from red-blood solutions, as rayon is spun. The solution used, whether for steeping or spinning, comprises red-blood residue prepared by using chemical means (salt solutions and ether solutions) and mechanical means (repeated centrifuging and stirring) to break up and dissolve most of the structural matter of the red-blood corpuscle. A clear solution is obtained by filtration.

Application Ser. No. 519,686, filed January 25, 1944, now Patent No. 2,527,210, dated October 24, 1950, discloses a better method for obtaining the hemoglobin solution, namely, subjecting a quantity of red-blood residue to "instantaneous" freezing at temperatures of the order of —85° F., and below, the volume of residue and shape of the container being so proportioned as to ensure the application of intense cold throughout the mass in a very few minutes. The rate of heat transfer corresponds to that secured by immersing blood residue in a 30 cc. test tube in a bath of hydrocarbon solvent and Dry Ice at —85° F.

Improved techniques for spinning sutures consisting substantially entirely of red-blood residue are disclosed in applications Ser. No. 547,317, filed January 29, 1944, now Patent No. 2,457,804, dated January 4, 1949, and Ser. No. 597,949, filed June 6, 1945, now Patent No. 2,484,823, dated October 18, 1949.

Improved therapeutic effects may be imparted to hemoglobin solutions by dissolving therapeutic agents such as penicillin in them, as disclosed in application Ser. No. 569,919, filed December 26, 1944, now Patent No. 2,477,171, dated July 26, 1949, and these effects will inhere in sutures prepared from such solutions.

Sutures may be formed from the peritoneal membrane by soaking strips of that membrane in hemoglobin-stroma solutions and then stretching the strips while consolidating them into cylindrical form. The hemoglobin solution is incorporated in such sutures not only in the form of an impregnant, but also as a binder, since it is entrained upon the surface of the strips before consolidation as well as absorbed into the cells thereof. This is disclosed in application Ser. No. 525,458, filed March 7, 1944, now Patent No. 2,487,041, dated November 8, 1949.

In short, surgical sutures containing substantial quantities of hemoglobin have been heretofore produced by me, and it is to such sutures that my present invention relates.

In its simplest aspect, the process of my invention involves no more than the treatment of a hemoglobin-containing suture with alcohol for a fairly substantial time interval. Although the technique is simple, its effects are highly significant. The result of this treatment is the conversion of hemoglobin near the surface of the strand from its usual state into a distinctly different state, characterized in that the strand takes on a translucent, glassy appearance. This change may be referred to as a "visible" change, because it is perceptible upon careful gross inspection, that is, with the unaided eye especially if a beam of light is passed through the strand. On microscopic examination, it becomes evident that the peripheral portion of the strand has largely or entirely crystallized. On spectroscopic examination of the crystalline material, the characteristic hemoglobin lines appear. On application of a selective stain, such as Mallory's (acid fuchsin, aniline blue) stain, the hemoglobin stains a bright red.

But it is by no means certain that the crystals consists entirely of hemoglobin. In fact, I suspect that they are of a relatively complex character, and that with hemoglobin-impregnated fiber-base sutures, they may comprehend other components of the impregnating solution. Nevertheless, for lack of a better term, this material will be referred to hereinafter as "crystalline hemoglobin," it being understood that by that term I mean to define the crystalline product resulting from the application of alcohol to materials incorporating the residue of a hemoglobin-containing solution.

I assume that the transformation in state which occurs when a hemoglobin-containing suture is immersed in alcohol involves the conversion of the material near the surface of the strand into a form which is relatively impermeable to alcohol, for the rate at which this transformation proceeds becomes progressively slower as the change in state progresses radially inward. Eventually this inward development of crystallization apparently ceases, leaving a "core" of substantial size, in which there seems to be no perceptible change. It may be that longer immersion would produce still further change. But as between a strand removed from the alcohol after five days (120 hours) and one permitted to remain for several weeks, no significant difference in inward development of the crystalline state was noted.

This is illustrated by the following comparison.

A strand of surgical catgut (not chromicized) was steeped in a hemoglobin-stroma solution (prepared as described above and in application Ser. No. 519,686) for twenty-one days. The strand was then dried in sterile air and cut into shorter lengths. These lengths were placed in alcohol, and subsequently removed sequentially. One such length, removed at the end of two hours, showed scarcely any evidence of crystallization, even at the surface of the strand. In another length, allowed to remain in alcohol for five days, the hemoglobin had crystallized to a depth approximating 6% of the diameter of the strand. Crystallization to approximately the same extent was evident in another length, which had been allowed to remain in alcohol for twenty-five days.

In preparing transverse sections of the suture for microscopic examination, the sutures are drawn through molten paraffin until they have absorbed a sufficiently heavy coat to protect them, and are next firmly embedded in a block of softened paraffin which is then hardened. The sutures can then be cut and stained more or less effectively.

The reactions of living tissue to the presence of sutures have been evaluated by implanting short lengths of the sutures to be tested in the abdominal cavity of laboratory animals, preferably in the sub-mucosal layer of the stomach.

After the sutures have been implanted, the stomach is restored to the peritoneal cavity and the edges of the incision are approximated and sutured in the usual way. When the desired time interval has elapsed, the animals are sacrificed, and specimens of tissue containing the strands are removed, hardened in formalin, embedded in paraffin, sectioned and stained. The sections are cut as nearly as possible at right angles to the path of the suture, so as to approximate a true cross-section. The staining may be done with hematoxylin-eosin, or preferably with some double or triple stain having a selective effect on hemoglobin. The Mallory stain mentioned above is particularly effective. The usual cover glass is then applied, care being taken to mark the specimen in accordance with the identification afforded by colored thread attached to each suture before implantation. Specimens so stained and mounted may be studied at different magnifications, and may readily be photographed with any desired objective.

Using procedures such as outlined above, I have made many comparisons to ascertain the nature of the reactions which follow the implanting of different sutures in living tissue. In one typical series of comparisons, I have employed (a) ordinary catgut sutures; (b) chromicized catgut sutures; (c) catgut sutures impregnated with the hemoglobin-electrolyte-stroma solution disclosed in my application Ser. No. 519,686; and (d) catgut sutures impregnated with the hemoglobin stroma solutions of my application Ser. No. 519,686, but having a crystalline sheath, produced in accordance with the disclosure of the present application. The hemoglobin-containing sutures (c) and (d) were prepared by impregnating ordinary (not chromicized) catgut with the hemoglobin containing solution 23 days. Suture (d) was then dried in air for 2 hours, and then placed in alcoholic solution for 5 days. The alcoholic solution used contained 95% U. S. P. ethyl alcohol and 5% U. S. P. isopropyl alcohol. At the end of the 5 day steeping period, the sutures were removed and sterilized in xylene at 150° C. for 1 hour.

The ordinary catgut sutures, at the end of 5 days, had undergone fragmentation. There was a very pronounced degree of leucocytic infiltration, indicating the presence of pus in substantial amounts. In the 8 day specimen, the degree of leucocytic infiltration diminished, and a substantial part of the strand had been digested and destroyed. In the 25 day specimen, the strand had almost entirely disappeared, leaving behind a capsular ring of scar tissue.

The chromicized catgut sutures also had assumed a fragmented appearance in the 5 day specimen. Leucocytic infiltration was much less marked. A wide separation was apparent between the strand and the surrounding tissue. This is characteristic of the tissue reaction to chromicized catgut sutures, and is attributable, I believe, to the fact that the chromicizing agent is a very powerful poison. Neither the leucocytes nor the tissues themselves can flourish in the immediate vicinity of so powerful an agent. In the 8 day section, a fairly large portion of the chromicizing agent had apparently been dissolved, and leucocytic infiltration was much more apparent. The strand, however, was still, to a large extent, intact. At the end of 25 days, the leucocytes had disappeared, and approximately 50% of the cross sectional area of the strand had been digested and destroyed. The remainder of the strand was still separated from the adjacent tissue by a wide area.

Sutures impregnated with the hemoglobin-electrolyte-stroma solution, but not treated with alcohol, were very well received by the tissue in which they were embedded. The 5-day period showed some fragmentation of the strand and practically no polymorphonuclear infiltration. The 8-day specimen was marked by the development of a very substantial proliferation of fibro-connective tissue. The strand had been rather thoroughly broken up, and it seemed that the fibroblasts were actually utilizing the structure of the strand in the formation of new tissue. In the 25-day specimen, the strand had been so completely replaced that it was necessary to use a magnification of 970 diameters in order to find any trace of it. The entire defect caused by the passage of the suture had been filled with fibro-connective tissue.

Hemoglobin-containing sutures having a crystalline surface produced in accordance with the disclosure of the present application were equally well received by the tissues. Polymorphonuclear infiltration was minimal in the 5 day specimen, and in this instance, the strand was practically intact. In the 8 day specimen the strand had been somewhat more extensively broken up, no evidences of leucocytic infiltration could be seen, and the development of fibroblasts in the periphery of the defect was plainly apparent. In the 25 day specimen, fibro-connective tissue had significantly increased. Nonetheless, the central core of the strand remained practically intact, and, although the sheath of crystalline hemoglobin had diminished in thickness, it was plainly to be seen surrounding the central core.

On the basis of studies such as these, too numerous to recount in detail in this paper, I have concluded that it is possible to delay absorption of a hemoglobin-containing surgical suture in living tissue by application of the treatment described above—namely, by steeping it in alcohol for an interval of time ranging from an hour or so up to 5 days. The steeping may be continued for a longer interval if desired, but does not seem to produce any significant difference in inward development of the crystalline state, although it does seem to increase, though very slightly, the resistance to absorption by living tissue.

Numerous comparative observations have been made, using sutures which contained varying amounts of hemoglobin. It should be noted that the amount of hemoglobin taken up by a natural-fiber suture soaked in hemoglobin-electrolyte-stroma solution varies in proportion to the absorptiveness of the strand, as well as the time of immersion and strength of solution. Some commercial sutures have been tanned and hardened to such a degree that it requires a considerable interval to secure adequate penetration. Other suture materials are highly absorbent, and will become thoroughly impregnated in very little time.

Non-irritant and healing properties are imparted by the hemoglobin, in proportion to the amount present, even though it be very small. To attain resistance to premature absorption, however, it seems to be important to ensure the presence of a fairly substantial amount of hemoglobin before the suture is steeped in alcohol. Sutures spun from hemoglobin solutions of course contain hemoglobin in abundance. On the other hand, catgut sutures which have been permitted to remain in the hemoglobin-electrolyte-stroma solution for no more than a brief interval, say 10 or 15 minutes, apparently do not absorb a sufficient amount of hemoglobin to produce a significant degree of crystallization, upon subsequent steeping in alcohol, no matter how long they are steeped. Vegetable-fiber sutures, such as those of linen and cotton, and also sutures of silk, appear to have sufficient capacity for absorbing the hemoglobin solution to permit them to pick up an ample quantity in significantly shorter intervals than must be allowed for such animal-fiber sutures as those of "catgut," tendons or ligaments.

The importance of the degree of crystallization is three-fold. In the first place, as explained above, the presence of hemoglobin ensures substantial freedom from tissue irritation. Consequently, the longer the hemoglobin persists, the more certain it becomes that irritant effects will not develop during the healing process. Crystallization reduces the rate at which hemoglobin is absorbed, and therefore by control of the degree of crystallization it becomes possible to ensure a prolongation of the non-irritant effect, to match the healing prognosis.

In the second place, crystallization seems to render the surface of the strand relatively impervious to tissue fluids, enzymes, etc. These agencies tend to weaken organic sutures. Since they penetrate the outer surface of a crystallized strand less readily, their action on the organic core of the strand is either postponed or retarded. Consequently the tensile strength of the suture is not quickly lost, but diminishes very gradually. By controlling the degree of crystallization, it is possible to ensure the retention of a high degree of tensile strength in tissue to match the healing prognosis.

Finally, it has been my observation that fibroblasts and fibro-connective tissue cells appear to derive actual nourishment from hemoglobin. This is a tentative conclusion, based on the observation that the presence of hemoglobin in living tissue is followed by a very marked proliferation of new tissue cells. Such an unusual proliferation of fibrocytes is known under the name of hyperplasia. But I believe I am the first to have associated it with the presence of hemoglobin and to have discovered that it may be induced in any given locale, by introducing hemoglobin at that point. Of course it may be that the hemoglobin serves merely as a catalyst or stimulant, rather than as a food. Be that as it may, a more extensive hyperplasia seems to occur if the hemoglobin is not quickly absorbed, but is made available in smaller amounts over a longer time interval. By crystallizing the hemoglobin I can promote this action, whereby maximum advantage is taken of these growth-stimulating properties.

A few words should be added here on the possibility of modifying the fixative treatment by varying the nature of the alcohol employed. I prefer to use medicinal alcohol, of approximately full strength (ethyl alcohol U. S. P.). However, it is possible to secure acceptable results with less concentrated alcohol solutions. A 75% solution of ethyl alcohol (by volume) will prove quite satisfactory, but the steeping time should be increased. Even at 50% strength, crystallization will be effected without excessive time-loss, and without serious loss of hemoglobin. However, it is to be borne in mind that hemoglobin is soluble in water, and that aqueous solutions containing less than 50% of alcohol (by volume) will leech out fairly substantial amounts of the hemoglobin and will interfere with proper crystallization. For this reason, the standard aqueous alcohol solution, containing only 41.5% by weight (or 48.9% by volume) of absolute alcohol, is relatively unsatisfactory. This tendency of that standard alcohol solution to dissolve hemoglobin would seem to indicate that alcohol should not be used for treating hemoglobin-containing sutures. It is surprising to find that the concentrated (U. S. P.) solution produces results so markedly different.

Although my preference is for solutions of ethyl alcohol, I have found that beneficial results can be secured with other medicinal alcohols, such, for instance, as isopropyl alcohol. This may be very advantageously blended with ethyl alcohol so as to produce results practically equivalent to those given by the ethyl alcohol solution, at a substantial saving in cost. However, it has seemed to me that isopropyl alcohol is more likely to leave a slightly irritant residue after heat sterilization of the crystallized suture. For this reason, I recommend the use of relatively small proportions of isopropyl alcohol in admixture with ethyl alcohol. Where the ratio of ethyl alcohol to isopropyl alcohol is nine parts or more of ethyl and one part or less of isopropyl, I have found no significant difference between the results following use of the mixture and the results which follow use of ethyl alcohol alone.

Although tubing (i. e., packaging) of the suture in alcohol or in an alcoholic aqueous solution might seem to be a logical step, I prefer to avoid this. Even a relatively neutral substance such as xylene, causes marked irritation on being introduced into living tissue, and for this reason especially I recommend that the sutures be removed from the fixative solution at the end of the treatment, and be sterilized at temperatures sufficient to volatilize the excess of free alcohol. Thereafter they may be tubed in any appropriate fluid. For this purpose, I prefer to use a neutral oil, such as peanut oil. Where the sutures have been made by impregnating an organic suture base, such a catgut, with hemoglobin, a very bland solution of a sulfonated salt of a higher alcohol or fatty acid may desirably be used. Such solution, however, have a tendency to cause swelling when applied to synthetic sutures produced by extruding a hemoglobin solution and spinning it as rayon is spun.

On the other hand, the hemoglobin constituent has a bacteriostatic effect, and this is sufficiently dependable to permit tubing the sutures in vacuo, or even in sterile air. Although this may result in some reduction of flexibility, sutures so preserved may easily be slightly softened, at the time of use, in water. Once the crystallized hemoglobin sheath has been formed, it is, of course, highly resistant to the dissolving action of water.

The amount of hemoglobin present in (as distinct from on) the suture also affects the rapidity and the extent of crystallization, and the resistance of the suture to premature absorption when implanted in living tissue.

Catgut sutures which have been steeped in hemoglobin solution for twenty-five days and have then been kept in the fixative solution for five days seem to show maximum resistance to absorption. Sections taken between sixty and ninety days after the implanting of such sutures still show traces of the original suture structure and of very small hemoglobin crystals. On the other hand, where the suture has been left in hemoglobin solution for only a few hours, dried, and then immersed in the fixative solution for five hours, no traces of the suture could be found at the end of sixty days, although some evidence of it was discernible in a forty-five day section.

I therefore conclude that it is possible to control the rate of absorption of a surgical suture in living tissue by incorporating hemoglobin in its structure, and subjecting the hemoglobin containing suture to the action of a fixative solution for intervals of time varying from one hour up to about five days or more. Where the amount of hemoglobin incorporated in the suture is reduced, the time of exposure to the fixative solution should be increased. The extent of crystallization varies in proportion to the amount of hemoglobin present and the time of exposure to the fixative solution, and the extent of crystallization bears a direct relation to the resistance of the strand to absorption in living tissue.

This is believed to be a discovery of importance to the surgical profession. Heretofore delay in absorption of surgical sutures has been secured by subjecting them to tanning treatment of various sorts. Most common of these has been chromatization. But tanning agents, as is very well understood in this profession, are cell poisons, and the introduction of them into living tissue results in the initiation of a toxic reaction in the adjacent cellular structure. This is believed to be the explanation for the "halo" effect which has been frequently noted by workers in this field. The body acts to protect its tissues against the pernicious action of tanning agents by isolating a tanned catgut suture in the center of a tubule of scar tissue. Microscopic sections taken subsequently through the site of the suture show that such portions of it as have not already been destroyed by leucocytic action are in the form of islands, isolated by a substantial space or "halo" from the circumference of the defect produced by passage of the suture. The toxic effect of the chromicizing agent persists so long as any part of the suture structure remains, and new cells will not fill in the defect until the chromicizing agent has been completely eliminated. In contrast, new cells very shortly invade the channel of a hemoglobin-containing suture, and fill in the defect, with little or no evidence of leucocytic infiltration.

I claim:

1. The method of imparting to an absorbable surgical suture a controlled resistance to absorption when in living tissue, which method comprises the steps of immersing a surgical suture containing a substantial amount of hemoglobin in an aqueous solution comprising at least 50% ethyl alcohol, and maintaining it therein at least until visible modification of the light-refractive characteristics of the surface has occurred, and removing the suture from its alcoholic environment when the desired degree of resistance to absorption has been produced.

2. The method of claim 1, in which the hemoglobin-containing surgical suture is one which has been extrusion spun from a spinning solution containing hemoglobin.

3. The method of claim 1, in which the hemoglobin-containing surgical suture is one which has been formed by steeping an organic-fiber suture base in a hemoglobin-containing solution for from thirty minutes to thirty days until said solution has thoroughly impregnated at least the peripheral portion of the suture base.

4. The method of claim 1, in which the suture is maintained in the alcohol for at least one hour.

5. A method according to claim 1, in which the suture after removal from the alcohol is heated to drive off the alcohol and is then stored in a suture storing medium free of alcoholic constituents.

6. A surgical suture having substantial quantities of a material consisting essentially of the reaction product of hemoglobin and ethyl alcohol incorporated in its surface.

7. A hemoglobin-containing surgical suture characterized by the presence of hemoglobin in a central core and in a peripheral sheath therefor, the hemoglobin in the core portion being in a more readily soluble state than that in the sheath, the hemoglobin in the sheath being in a state consequent upon treatment with a liquid consisting assentially of ethyl alcohol.

8. A surgical suture having an organic fiber basis and having a dense, glossy, water-resistant peripheral portion throughout which hemoglobin crystals are present, said suture being characterized by a relatively higher resistance to absorption by body tissues than a surgical suture of the same composition in which the hemoglobin in the peripheral portion is not in a glossy, water-resistant state.

9. A non-irritant absorbable surgical suture having an organic fiber basis and incorporating in its structure an irritation-preventing compound, said compound being the product resulting from subjecting to reaction with a liquid consisting essentially of ethyl alcohol a suture which incorporates the residue of a hemoglobin-containing solution.

10. A surgical suture having an absorbable central core and an adherent peripheral sheath, in which the sheath comprises the reaction product of hemoglobin and alcohol.

11. The absorbable surgical suture of claim 10, in which the thickness of the sheath is equal to about $\frac{1}{8}$ of the radius of the suture.

JOHN O. BOWER.

REFERENCES CITED

The following references are of record in the file of this patent:

UNITED STATES PATENTS

| Number | Name | Date |
|--------|------|------|
| 794,623 | Herbabny | July 11, 1905 |
| 2,127,903 | Bowen | Aug. 23, 1938 |
| 2,128,701 | Gelinsky | Aug. 30, 1938 |
| 2,457,804 | Bower | Jan. 4, 1949 |
| 2,487,041 | Bower | Nov. 8, 1949 |
| 2,493,943 | Bower | Jan. 10, 1950 |

OTHER REFERENCES

Fieser and Fieser: Organic Chemistry, 1944, D. C. Heath & Co., pp. 432–436. Copy in Div. 55.